Jan. 19, 1954   J. E. BIRCH   2,666,562
MEANS FOR CRATING OR BOXING BOTTLES AND FOR
REMOVING BOTTLES FROM CRATES OR BOXES
Filed July 26, 1951   3 Sheets-Sheet 1
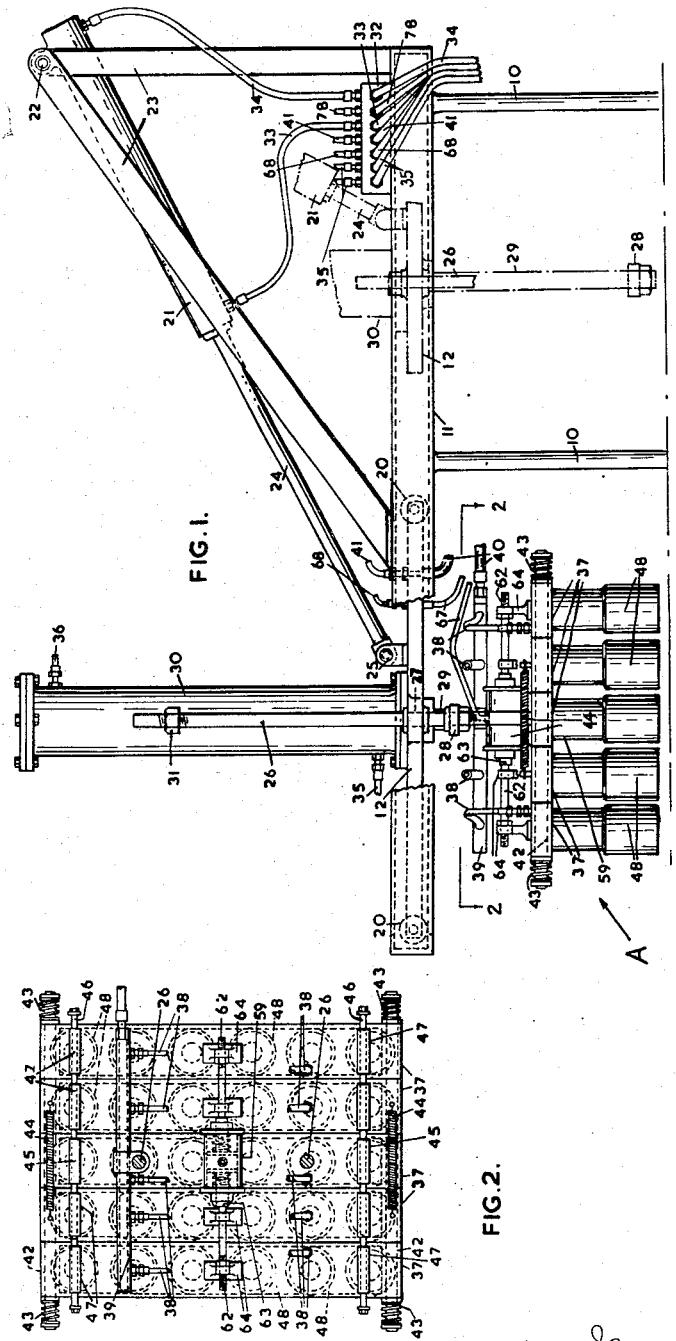
Inventor
James Edwin Birch
By Sevimer Parker
Attorney Jan. 19, 1954  J. E. BIRCH  2,666,562
MEANS FOR CRATING OR BOXING BOTTLES AND FOR
REMOVING BOTTLES FROM CRATES OR BOXES
Filed July 26, 1951  3 Sheets-Sheet 2
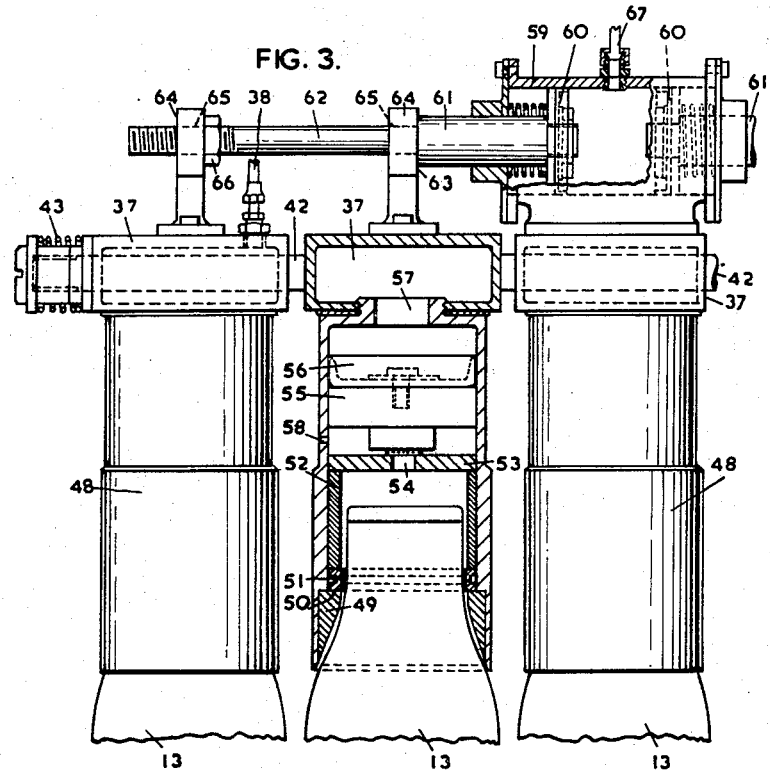
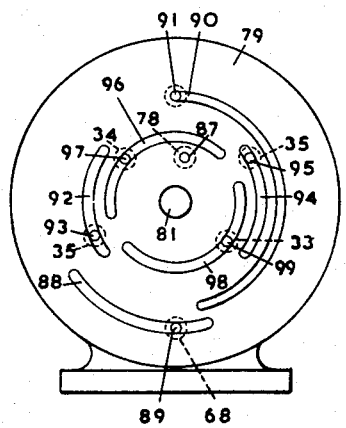
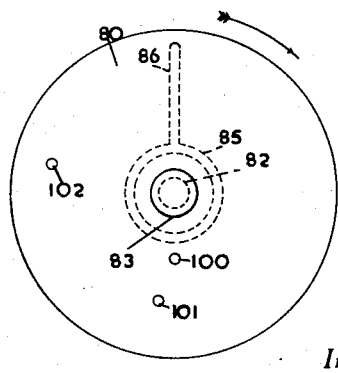
Inventor
James Edwin Birch
By
Scrivener & Parker
Attorney

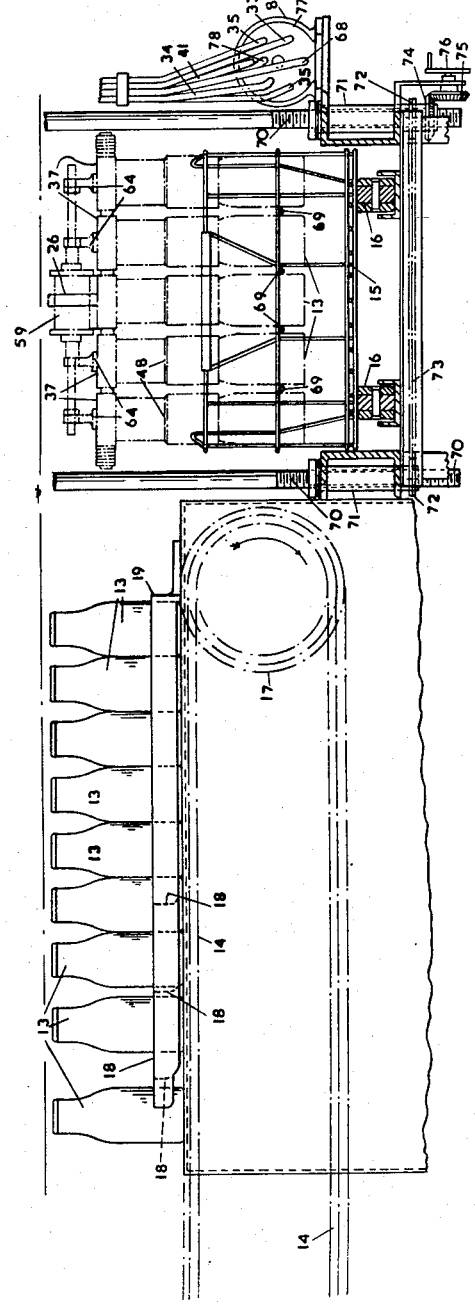

Patented Jan. 19, 1954

2,666,562

UNITED STATES PATENT OFFICE 2,666,562

MEANS FOR CRATING OR BOXING BOTTLES AND FOR REMOVING BOTTLES FROM CRATES OR BOXES

James Edwin Birch, Wolverhampton, England

Application July 26, 1951, Serial No. 238,644

12 Claims. (Cl. 226—14)

This invention relates to a machine for loading bottles, jars and like containers into crates or boxes and for the unloading of bottles and the like from crates or boxes, said loading and unloading operations being hereafter referred to by the generic term "handling bottles."

According to this invention, a machine for handling bottles comprises lifting means for a number of spaced rows of bottles, means for spacing the lifted bottles correctly in the rows, and traversing means for the lifting means, whereby a number of spaced rows of bottles can be lifted and the lifted bottles spaced correctly in the rows, the lifting means traversed to a position over a located crate or box and lowered so as to load the correctly spaced bottles into the crate or box and release them.

The machine may comprise an operating head adapted for traversing movement and incorporating a bottle engaging mechanism and means for raising and lowering the latter, the engaging mechanism comprising a plurality of bottle gripping elements which are movable laterally relative to each other from one disposition, in which they are adapted to hold a number of spaced rows of bottles, to a second disposition in which the bottles held thereby are spaced apart in the rows a distance corresponding to the spacing of crate compartments.

The bottle engaging mechanism may be mounted upon a carriage which is traversable in guides provided on the frame of the machine, and the engaging mechanism mounted on the carriage may comprise a plurality of bottle gripping elements spaced apart in rows and adapted for relative lateral movement between said rows from one disposition, in which the elements can grip and lift a number of spaced rows of bottles in which adjacent bottles are touching in the rows, to another disposition resulting from said lateral movement, in which the individual bottles are spaced apart in the lifted rows.

The guides, or a portion of the framework of the machine which supports the guides may be adapted to be adjusted bodily in vertical direction upon the machine, so that the machine can be used with bottles of different dimensions in height.

The traversing of the carriage and the raising and lowering of the bottle engaging mechanism may be effected by means of cylinders operated by pressure fluid.

The bottle engaging mechanism may comprise a number of elongated members arranged in close parallel relationship and mounted upon guides for lateral sliding movement relative to each other, each member being provided with a row of spaced bottle gripping elements and the relative member between said members may be effected by means of a cylinder operated by fluid pressure.

The gripping elements may be operated by fluid pressure, and the elongated members may be tubular or of hollow rectangular construction to serve as manifolds for supplying pressure fluid to operate the gripping elements mounted thereon.

Each gripping element may comprise an inverted cup-like member for receiving the neck of a bottle, the said member having a ring of resilient material positioned in its inner wall and adapted to be contracted to grip the bottle neck. In this latter connection the ring may be of rubber or like resilient material, of channel shape in cross-section with the base forming the inner periphery of the ring, the said ring being mounted within the cup-like member so that it rests upon an internal annular shoulder and a piston being adapted to slide in the cup-like member above the ring, and to impart downward pressure upon the ring by means of compressed air or other fluid pressure so as to bulge it radially inwards and cause it to contract upon and grip the neck of a bottle.

A distributor valve may be provided, which controls the supply of pressure fluid to the cylinders and the gripping elements, said valve being adapted to effect repetitions of a cycle of operations of the cylinders and gripping elements, whereby the machine functions automatically.

An embodiment of the invention will now be described with reference to the accompanying drawings, in which:

Fig. 1 is a side elevation of the upper portion of a bottle handling machine.

Fig. 2 is a fragmentary plan view of the bottle engaging mechanism, taken on the line 2, 2, of Fig. 1.

Fig. 3 is a fragmentary side elevation of the bottle engaging mechanism, to an enlarged scale and partly in section.

Figs. 4 and 5 are diagrammatic views of the two main parts of a valve for controlling the operations of the machine.

Fig. 6 is a side elevation of the lower portion of the bottle handling machine shown in Fig. 1 and is a continuation thereof.

Referring to Figs. 1 to 3 of the drawings, the framework of the machine comprises four main supporting pillars, two of which can be seen at 18 in Fig. 1, which carry between them a horizontal rectangular frame 11. This frame 11 is the support for an operating head consisting of a carriage 12 upon which is mounted a bottle engaging mechanism indicated generally at A in Fig. 1, and of which Fig. 2 is a plan view. The general function of the operating head is to lift a crate-load of bottles 13 from an endless conveyor belt 14, and insert them in a located crate 15 which is on conveyor chains 16 travelling at right angles to the conveyor belt 14.

The bottles 13, after leaving a filling mechanism (not shown) are carried along by the wide conveyor belt 14 until, near the tail-drum 17, they encounter a marshalling framework which consists of seven parallel partitioning arms 18 extending from a stop plate 19 above the upper surface of the conveyor belt 14 and in line therewith, so that as the bottles enter this marshalling framework they sort themselves into six parallel rows with the bottles touching in the rows, but with the distance between the rows corresponding to the spacing of crate compartments.

The carriage 12 of the operating head runs on wheels 20 in the frame 11 which is of channel-section so that the flanges provide horizontal guides for the wheels, and the carriage is traversed in its guides by means of a double acting fluid pressure cylinder 21 pivotally mounted at 22 in a superstructure 23 secured to the frame 11, the piston rod 24 being pivotally secured to a lug 25 on the carriage 12 and the arrangement being such that the operating head can be traversed from the position shown in full lines, i. e. above the marshalled bottles 13, to the position shown in chain lines, at the right in Fig. 6, i. e. above the conveyor chains 16 and a positioned crate 15, and vice versa.

The bottle engaging mechanism A is mounted upon the carriage 12 by means of two vertical rods 26 which are secured to the said lifting mechanism at their lower ends, and are slidable in bearing holes 27 in the carriage 12. A horizontal cross-bar 28 connects the two rods 26 below the carriage 12, and to the centre of this cross-bar is secured the outer end of the piston rod 29 of a fluid pressure cylinder 30 mounted in an inverted vertical position in the centre of the carriage 12, this cylinder 30 effecting the raising and lowering movements of the engaging mechanism A. An adjustable stop nut 31 is provided upon each rod 26, and the lowest possible position of the engaging mechanism is determined by the nuts 31 encountering the carriage 12.

A pipe-line bulkhead 32 is mounted upon the frame 11, and from this bulkhead, flexible conduits 33, 34 supply the respective ends of the cylinder 21, and a further flexible conduit, a portion of each end of which is shown at 35, connects the bottom of the cylinder 30 with the bulkhead 32. The cylinder 30 may be double-acting, particularly if the pressure fluid is hydraulic, and in this case a further flexible conduit 36 will connect the top of the cylinder 30 with the bulkhead 32, but if the system is pneumatic the conduit 36 will be open to atmosphere, as the mechanism A will lower with sufficient speed under its own weight and will only require to be raised by the compressed air.

The engaging mechanism comprises five elongated rectangular members 37 which are each of hollow construction, and to the interior of each pressure fluid is supply by flexible conduits 38 from a common supply tube 39 mounted upon one of the rods 26, the tube 39 being supplied by a single flexible conduit 40, the upper end of which is secured by unions to the carriage 11, and is in turn connected by a further flexible conduit 41 with the supply bulkhead 32.

The central rectangular member or manifold 37 is secured to the bottom of the rods 26, and at each end thereof is secured a horizontal guide rod 42, upon which guide rods the remaining four manifolds 37 are slidable laterally, the two outer ones against the action of springs 43, and the two inner ones against the action of tension springs 44, said springs 43 and 44 tending to retain the manifolds 37 in their normal position, shown in Fig. 2, i. e. in contact with each other. Additional guides may be provided, as shown in Fig. 2, consisting of a bracket 45 secured near each end of the central manifold 37, each bracket carrying a horizontal guide rod 46 with which further brackets 47 on the remaining manifolds are slidably engaged. The manifolds 37 are arranged transversely to the direction of traverse, and each manifold carries a row of six bottle gripping elements 48 arranged in spaced relationship in the rows to correspond with the spacing between the marshalled rows of bottles 13, and in the normal touching position of the manifolds the distance between the rows of elements 48 corresponds with the spacing of the necks of touching bottles, as can be seen most readily in Fig. 1, in which the thirty bottle gripping elements 48 are each vertically above a bottle 13, so that, when the engaging mechanism lowers, each element 48 will engage a bottle.

Each element 48 details of which are shown in Fig. 3, comprises an inverted cup-like member secured to the underside of a manifold 37 and the mouth of each member contains a press-fitted flared Phosphor-bronze insert 49 for guiding the neck of a bottle 13 into the said member. The insert 49 also provides an internal annular shoulder 50 in the bore of the member 48, and resting on this shoulder 50 is a rubber ring 51 which is of channel or U-shape in cross-section with the base forming the inner periphery of the ring. Above the ring 51 and resting thereon is a metal sleeve 52 which is slidable in the bore of the member 48, and above the sleeve is a flat disc 53 with a central hole 54, whilst on top of the disc is a floating piston consisting of a metal body portion 55 and piston washer 56. The bore of the member 48 above the piston washer 56 is in direct communication with the hollow interior of the manifold 37 through the central opening 57, so that pressure fluid admitted to the said manifold forces the piston downwardly, causing the ring 51 to be compressed so that it bulges radially inwards and contracts upon the neck of the bottle 13 to grip the latter.

The gripping elements, in descending upon the bottles 13 may have air trapped in the cuplike portions which enclose the bottle necks, and provision is made to allow the escape of this trapped air via the central opening 54 in the disc 53 and a hole 58 in the wall of the member 48, the projection on the underside of the piston body 55 having a lateral saw cut on its underside so that it does not seal the hole 54.

When the fluid pressure upon the piston 56 is released, the resiliency of the ring 51 returns the assembly (comprising sleeve 52, disc 53 and the piston) upwardly, and a bottle gripped by the ring 51 is released.

After lifting a load of spaced rows of touching bottles 13, before they can be inserted in a crate the bottles must be spaced apart in the respective rows, and this is effected by moving the manifolds laterally relative to each other through appropriate distances upon the guide rods 42 and 46, by means of a fluid pressure cylinder 59 mounted upon the central manifold 37. The cylinder 59 houses two opposite acting pistons 60, the piston rod of each of which consists of an inner end portion 61 of greater diameter than an outer end portion 62, so providing an annular shoulder 63 on each piston rod. Centrally positioned upon each of the movable manifolds 37 is secured an upstanding bracket 64 provided with an eye 65 within which the smaller diameter portion 62 of a piston rod is slidable. The outer end of the portion 62 of each piston rod is threaded and carries a nut 66 which is engaged behind the bracket 64 of each outer manifold at all times. In the normal touching position of the manifolds, shown in full lines in Fig. 1, and in Fig. 3, there is a gap between the shoulders 63 on the piston rod and the bracket 64 on the inner manifolds 37, and the arrangement is such that as the pistons 60 are moved outwardly by pressure fluid, the nuts 66 engaging the brackets 64 on the outer manifolds move the latter along their guide rods. During this movement the shoulders 63 also engage behind the brackets 64 on the inner movable manifolds 37 which are also moved along the guide rods, the outer manifolds moving twice the distance that the inner manifolds are moved, into the relative positions shown in Fig. 6 in chain lines, and Fig. 3, the result being that the bottles 13 are spaced correctly in the rows to correspond with the spacing of crate compartments.

Pressure fluid is supplied to the centre of the cylinder 59 by a flexible conduit 67 connected by a union to the carriage 12, and in turn connected by a further flexible conduit 68 with the bulkhead 32.

Commencing with the position of the engaging mechanism A as shown in full lines in Fig. 1, the operation of the machine, operated pneumatically, is as follows:

The lifting mechanism descends under its own weight as compressed air supply to the bottom of the cylinder 30 is cut off, and the gripping elements 48 each engage the neck of one of the marshalled bottles 13, the bottles themselves stopping the descent of the lifting mechanism. Compressed air supplied to the manifolds 37 then causes the rings 51 of the grippnig elements to be contracted upon the bottle necks and as compressed air is again admitted to the bottom of the cylinder 30, the mechanism A is raised together with the gripped crate-load of bottles 13. The whole operating head is then traversed, to the right in Fig. 1, as compressed air is admitted to the appropriate end of the cylinder 21, the carriage 12 of the operating head running along the guides in the frame 11 until the position of the piston and carriage indicated in chain lines in Fig. 6 is reached, and the engaging mechanism A is vertically above the crate 15. The crate which is one of a continuous line upon the conveyor chains, will be held stationary in predetermined loading position by any suitable mechanism, for the necessary period of time, a suitable mechanism for this purpose being described in our copending British patent application No. 29,539 of 1950.

As soon as the traversing is completed, the pressure air to the bottom of the cylinder is cut off and the engaging mechanism descends. Pressure air may be supplied to the cylinder 59 to move the manifolds 37 laterally relative to each other at any time once the bottles have been lifted clear of the arms 18 of the marshalling frame, e. g. during the traverse, or whilst the engaging mechanism is descending and approaching the positioned crate, but it is preferred that this movement of the manifolds is delayed until the lower ends of the bottles are within the confines of the crate 15 but above the partitions therein, indicated at 69 in Fig. 6. When the manifolds 37 move to the position shown in chain lines in Fig. 6 and in Fig. 3, the bottles are all correctly spaced relative to each other, and each enters a compartment of the located crate 15, whereupon pressure air is cut off from the manifolds, the rings 51 release the bottles, and the latter drop a short distance into the crate 15.

The engaging mechanism is then raised fully as compressed air is re-admitted to the bottom of the cylinder 30. Air pressure is then cut off from the cylinder 59 and the manifolds are returned to their normal touching position by the springs 43 and 44, and the cylinder 21 is supplied with compressed air to traverse and return the whole operating head back to the position shown in full lines in Fig. 1. As soon as one load of bottles has been raised and the operating head traversed, the conveyor 14 ensures that they are replaced, in the marshalling frame, ready for the cycle of operations to be repeated, and as soon as one crate is filled it will be allowed to move away upon the conveyor chains 16 and another empty crate will be held in position ready to be loaded.

In order that the machine may be used for handling bottles of different dimensions in height, the four main pillars 10 are screwthreaded at 70 at their lower ends, and the screwthreaded portion of each pillar passes through an internally threaded sleeve 71, which sleeves are rotatably mounted in the side frames 72 of the chain-conveyor 16. Each sleeve 71 has a chain sprocket 72 secured at its lower end, and over these four sprockets, two of which are seen in Fig. 6, passes an endless chain 73. One of the sleeves 71 also has a bevel gear 74 secured thereto, which meshes with a further bevel gear 75 rotatable by means of a hand wheel 76, and thus, by rotating the hand wheel, all the sleeves 71 can be rotated together and equally so that all the pillars 10 and the frame 11 carried thereby will be raised or lowered bodily.

The machine may be adapted for continuous automatic operation by means of a rotary distributor valve indicated diagrammatically at 77 in Fig. 6, and in more detail in Figs. 4 and 5.

Referring to Figs. 1 and 6, air delivery conduits from the body of the valve 77 connect via the bulkhead 32 with the corresponding conduits 33, 34, 35, 41, 68 supplying the various cylinders and manifolds 37, the function of the valve being to supply pressure air to the appropriate conduits in correct sequence and timing, so as to operate the machine in repetitions of the cycle previously described.

The appropriate conduits connecting the bulkhead 32 with the body of the valve 77 are referenced to correspond with the conduits connecting the bulkhead 32 with the various cylinders and manifolds 37, whilst a conduit 78 represents a common supply conduit bringing compressed air to the valve 77 for distribution from a compressor or storage tank (not shown).

Referring to Figs. 4 and 5, the valve consists of a stationary portion in the form of a flat disc 79, and a rotatable portion 80, also in the form of a flat disc adapted for face-to-face engagement with the stationary disc 79. A central locating pin 81 is provided on the stationary disc 79, and a central socket 82 is provided in the rotatable disc 80 for receiving the pin so that the said disc 80 rotates upon the pin 81. A central shaft 83 on the outer face of the disc 80 is used for driving the latter in rotation, as by means of an electric motor indicated at 84 in Fig. 6.

The face of the disc 80 which engages the face of the disc 79 is provided with a circular groove 85 with which connects a radial groove 86. The common supply conduit 78 terminates in a port 87 in the face of the disc 79, which port coincides with the circular groove 85 in the rotatable disc 80 so that pressure air is delivered to the grooves 85 and 86 from the source of supply at all times, the groove 86 distributing the air to a number of arcuate grooves in the face of the disc 79 during rotation of the disc 80. The outermost groove 88 connects by a port 89 with the conduit 68 ultimately supplying the cylinder 59 for moving the manifolds 37. The groove 90 has a port 91 connecting with the conduit 41 which ultimately supplies the manifolds 37 with air to operate the gripping elements 48. The groove 92 has a port 93 leading to conduit 35 supplying air to the bottom of the cylinder 30 which raises the engaging mechanism, and since this cylinder operates to lift twice in one cycle, there is a similar groove 94 with port 95, also shown as connecting with conduit 35. The groove 96, with a port 97 leading to conduit 34, supplies one end of the cylinder 21 for traversing the operating head in one direction, whilst a similar groove 98 with a port 99 supplies the other end of the same cylinder 21 via conduit 33 for traversing the operating head in the other direction.

With the disc 80, in the position shown in Fig. 4, superimposed upon the stationary disc shown in Fig. 5, and the disc 80 rotating in the direction of the arrow in Fig. 4, it will be seen that the groove 86 is supplying groove 96 and conduit 34 so that the cylinder 21 has its piston rod held extended as shown in Fig. 1, and at the same time an exhaust port 100 in the disc 80 is in communication with the groove 98 and conduit 33 connected with the other end of the cylinder 21. The bottle engaging mechanism will be down under its own weight with the gripping elements in engagement with a load of bottles, and groove 86 having reached groove 90, the rings 51 will have just contracted to grip the bottle necks. The groove 86 next reaches groove 94 so that conduit 35 supplies compressed air to the cylinder 30 and the engaging mechanism is raised and held in the raised position. The groove 98 is then reached, groove 96 having been left by the groove 86 and the exhaust port 100 having reached groove 96, so that pressure air is now supplied to conduit 33, whilst conduit 34 is open to exhaust and the whole operating head is traversed into position above the located crate. As the groove 86 leaves the groove 94 the engaging mechanism descends under its own weight, and when the next groove 90 is reached by the groove 86 the manifolds are moved laterally relative to each other as air is supplied to the manifolds 37 through the conduits 66 and 67. Immediately thereafter the groove 86 leaves the groove 90 and an exhaust port 101 reaches the said groove 90, so that the manifolds 37 are exhausted and the rings 51 release the bottles which drop into the crate. The next groove to be reached by the groove 86 is the groove 92, which supplies air via the conduit 35 to the cylinder 30 to again raise the bottle engaging head, air exhausting from the top of the cylinder 30 through the port 36. The groove 93 is left by the groove 86, and the exhaust port 100 reaches groove 98 after leaving groove 96, so that pressure air is supplied to conduit 34 whilst conduit 33 is opened to atmosphere, resulting in the whole operating head being traversed back above the marshalled bottles. The groove 88 is left by groove 86 and an exhaust port 102 reaches the groove 88, so that the cylinder 59 is opened to atmosphere and the manifolds return to normal position shown in Fig. 1. As groove 86 leaves groove 92, the engaging mechanism descends to engage another load of bottles, and the cycle just described repeats.

The same distributor valve 77 may be utilised to operate a crate stop and holding mechanism in correctly timed sequence, and whilst in the above description, which is by way of example only, the air is supplied directly from the valve to the various cylinders, it will be appreciated that the valve 77 may be adapted to control the operation of other valves, which in turn control direct supply of pressure fluid to the operative parts of the machine.

The bottle engaging mechanism described and shown handles thirty bottles, in five rows of six in a row, but with suitable modifications bottle engaging mechanisms may be constructed to handle a different number of bottles, say twenty-four in four rows of six in a row, within the scope of this invention.

The operation of loading bottles into crates has been particularly described, but it will be obvious to those skilled in the art that with but slight modification, the machine constructed according to this invention can be used in reverse for unloading bottles from crates, and when so used the manifolds 37 can be held in their "expanded" position as shown in Fig. 3, since there is no necessity to bring the rows of bottles into touching relationship in the rows before depositing them upon a conveyor belt.

Having fully described my invention, what I claim and desire to secure by Letters Patent is:

1. In a machine for handling bottles, the combination of lifting means for a number of spaced rows of bottles, spacing means incorporated in said lifting means for spacing lifted bottles apart in the rows, and conveying means for said lifting means, whereby a number of spaced rows of bottles can be lifted, the lifted bottles spaced apart in the rows, and the lifting means traversed between predetermined bottle pick-up and bottle discharge positions for loading the spaced bottles into a crate.

2. In a machine for handling bottles, the combination of an operating head, means to convey said operating head, a bottle-engaging mechanism incorporated in said head, and means for raising and lowering the bottle-engaging mechanism, said bottle engaging mechanism comprising a plurality of bottle gripping elements, means for moving said bottle gripping elements apart relative to each other from one disposition, in which they are adapted to hold a number of spaced lines of bottles having the spacing between the lines corresponding to the spacing of crate compartments, to a second disposition, in which the bottles held thereby are spaced apart in the lines a distance corresponding to the spacing of crate compartments.

3. In a machine for handling bottles, the combination of a carriage, guides upon which said carriage is traversable, means to convey said carriage, a bottle-engaging mechanism and means for effecting raising and lowering movements of said engaging mechanism both mounted upon said carriage, said bottle engaging mechanism comprising a plurality of bottle gripping elements arranged in parallel rows and spaced apart in the rows, means for moving said rows bodily relative to each other in horizontal direction transverse to the lengths of the rows, whereby the disposition of said elements can be altered from an initial disposition in which the elements are disposed for gripping a number of spaced lines of bottles which are touching in the lines, the spacing between the lines corresponding with the spacing of crate compartments, to a second disposition, resulting from said lateral transverse movement of the rows of elements, in which the individual gripped bottles are spaced apart in the lines to correspond with the spacing of crate compartments.

4. In a machine for handling bottles, the combination of a carriage, guides upon which said carriage is traversable, means to convey said carriage upon the guides between predetermined bottle pick-up and bottle-discharge positions, a bottle engaging mechanism and means for effecting raising and lowering movements thereof both mounted upon said carriage, said bottle engaging mechanism comprising a number of parallel elongated members, horizontal guides disposed transversely to the elongated members upon which said members are slidable relative to each other, spring means urging said elongated members into close parallel relationship with each other, means for moving said members apart upon their guides into equally spaced relationship, a plurality of bottle gripping elements mounted upon said elongated members and arranged in parallel rows, one row upon each elongated member, with the elements equally spaced apart in the rows and disposed in rows transverse to the lengths of the elongated members.

5. In a machine for handling bottles, the combination of a carriage, guides upon which said carriage is traversable, means to convey said carriage upon the guides between predetermined bottle pick-up and bottle-discharge positions, means for adjusting said guides bodily in vertical direction, a bottle-engaging mechanism mounted for raising and lowering movements upon said carriage and means for effecting said raising and lowering movements, said bottle engaging mechanism comprising a number of parallel elongated members, horizontal guides disposed transversely to the elongated members upon which said members are movable relative to each other, spring means urging said elongated members into close parallel relationship with each other, means for moving said elongated members apart upon their guides into equally spaced relationship, a row of bottle gripping elements mounted upon each elongated member with the elements equally spaced apart in the rows and disposed in rows transverse to the lengths of the elongated members.

6. In a machine for handling bottles, the combination of a carriage, guides upon which said carriage is traversable, pressure fluid operated means for conveying said carriage upon said guides between pre-determined bottle pick-up and bottle discharge positions, a bottle-engaging mechanism mounted for raising and lowering movements upon said carriage and pressure fluid operated means for effecting raising and lowering movements of said mechanism, said bottle-engaging mechanism comprising a number of hollow elongated pressure fluid manifolds, horizontal guides upon which said manifolds are mounted in parallel relationship for movement relative to each other in direction at right angles to their length, spring means urging said manifolds into close parallel relationship with each other, pressure fluid operated means for moving said manifolds apart upon their guides into equally spaced relationship, a row of pressure fluid operated bottle gripping elements mounted upon each manifold, with the elements equally spaced apart in the rows and disposed in rows transverse to the lengths of the manifolds.

7. In a machine for handling bottles, the combination of a carriage, guides upon which said carriage is traversable, pressure fluid operated means for conveying said carriage upon said guides, a screw-jack mechanism for adjusting said guides bodily in the vertical direction, a bottle-engaging mechanism mounted for raising and lowering movements upon said carriage and pressure fluid operated means for effecting raising and lowering movements of said mechanism, said bottle-engaging mechanism comprising a number of hollow elongated pressure fluid manifolds, horizontal guides upon which said manifolds are mounted in parallel relationship for movement relative to each other in direction at right angles to their length, spring means urging said manifolds into close parallel relationship with each other, pressure fluid operated means for moving said manifolds apart upon their guides into equally spaced relationship, a row of pressure fluid operated gripping elements mounted upon each manifold for operation by pressure fluid therein, said elements being equally spaced apart in the rows and disposed in rows transverse to the lengths of the manifolds.

8. In a machine for handling bottles, a bottle engaging mechanism comprising in combination a number of elongated members, guides upon which said members are mounted in parallel relationship for relative movement in direction at right angles to their length, spring means urging said elongated members into close parallel relationship with each other, a plurality of rows of bottle gripping elements mounted in parallel relationship one row upon each of said elongated members, corresponding elements in the various rows being in line at right angles to said members, the spacing of said elements being such that bottles gripped thereby are disposed initially in a number of equally spaced parallel lines of touching bottles with the spacing between adjacent lines of bottles corresponding with the spacing of crate compartments, means for moving said elongated members apart relative to each other so as to space apart said touching bottles in the lines, with the spacing between adjacent bottles corresponding with the spacing of crate compartments.

9. In a machine for handling bottles, a bottle engaging mechanism comprising in combination a number of elongated hollow pressure fluid manifolds, guides upon which said manifolds are mounted in parallel relationship for relative movement in direction at right angles to their length, spring means urging said manifolds into close parallel relationship with each other, a plurality of rows of pressure fluid operated bottle gripping elements mounted in parallel relationship one row upon each of said manifolds, corresponding elements in the various rows being in line at right angles to said manifolds, the spacing of said elements being such that bottles gripped thereby are disposed initially in a number of equally spaced parallel lines of touching bottles with the spacing between adjacent lines of bottles corresponding with the spacing of crate compartments, a pressure fluid cylinder for moving said manifolds apart relative to each other so as to space apart said touching bottles in the lines, with the spacing between adjacent bottles corresponding with the spacing of crate compartments.

10. A machine for handling bottles, comprising in combination a carriage, guides upon which said carriage is traversable, pressure fluid operated means for conveying said carriage upon said guides between bottle pick-up and bottle discharge positions, a bottle engaging mechanism mounted for raising and lowering movements upon said carriage and pressure fluid operated means for effecting raising and lowering movements of said mechanism, said bottle engaging mechanism comprising a number of hollow elongated pressure fluid manifolds, horizontal guides upon which said manifolds are mounted in parallel relationship for movement relative to each other in direction at right angles to their length, spring means urging said manifolds into close parallel relationship with each other, pressure fluid operated means for moving said manifolds apart upon their guides into equally spaced relationship, a row of pressure fluid operated bottle gripping elements mounted upon each manifold with the elements equally spaced apart in the rows and disposed in rows transverse to the lengths of the manifolds, and distribution valve means controlling supply of pressure fluid to said pressure fluid operated means, pressure fluid manifolds and gripping elements for operation thereof in sequence and timed relationship.

11. A machine for handling bottles, comprising in combination, a carriage, guides upon which said carriage is traversable, a pressure fluid cylinder for conveying said carriage upon said guides between bottle pick-up and bottle discharge positions, a bottle-engaging mechanism mounted for raising and lowering movements upon said carriage and a further fluid pressure cylinder mounted upon said carriage for effecting raising and lowering movements of said mechanism, said bottle engaging mechanism comprising a number of hollow elongated pressure fluid manifolds, horizontal guides disposed parallel with the line of traverse of the carriage upon which guides said manifolds are mounted in close parallel relationship for movement relative to each other in direction at right angles to their length, a plurality of pressure fluid operated bottle gripping elements mounted in parallel rows arranged at right angles to the line of traverse of the carriage and each row upon a manifold with spaced relationship between adjacent elements in the rows corresponding to the spacing of crate compartments, a further pressure fluid cylinder for moving said manifolds apart upon their guides into equally spaced relationship in which the spacing between the adjacent rows of elements corresponds with the spacing of crate compartments, whereby a number of bottles arranged in spaced lines at the pick-up position can be gripped by the gripping elements, lifted, traversed to the discharge position and lowered, the manifolds can be moved relative to each other to cause the spacing between adjacent bottles to correspond with the spacing of crate compartments, and the bottles released into the compartments of a located crate at the discharge position, the manifolds returned to close parallel relationship, the engaging mechanism raised and traversed back to the pick-up position.

12. A machine according to claim 11, and incorporating a rotary distributor valve controlling supply of pressure fluid to said pressure fluid cylinders, manifolds and gripping elements, for effecting repetitions of the cycle of operations of the cylinders and gripping elements and automatic functioning of the machine.

JAMES EDWIN BIRCH.

References Cited in the file of this patent

UNITED STATES PATENTS

| Number | Name | Date |
|---|---|---|
| 1,828,416 | Kane et al. | Oct. 20, 1931 |
| 1,898,393 | Rickers | Feb. 21, 1933 |
| 2,007,064 | Shipley | July 2, 1935 |
| 2,358,447 | Creamer | Sept. 19, 1944 |
| 2,431,265 | Madsen et al. | Nov. 18, 1947 |